J. D. FANGER.
REAR AUGER ADJUSTMENT FOR BEET HARVESTERS.
APPLICATION FILED APR. 5, 1917. RENEWED JAN. 4, 1918.
1,273,757.
Patented July 23, 1918.
2 SHEETS—SHEET 1.
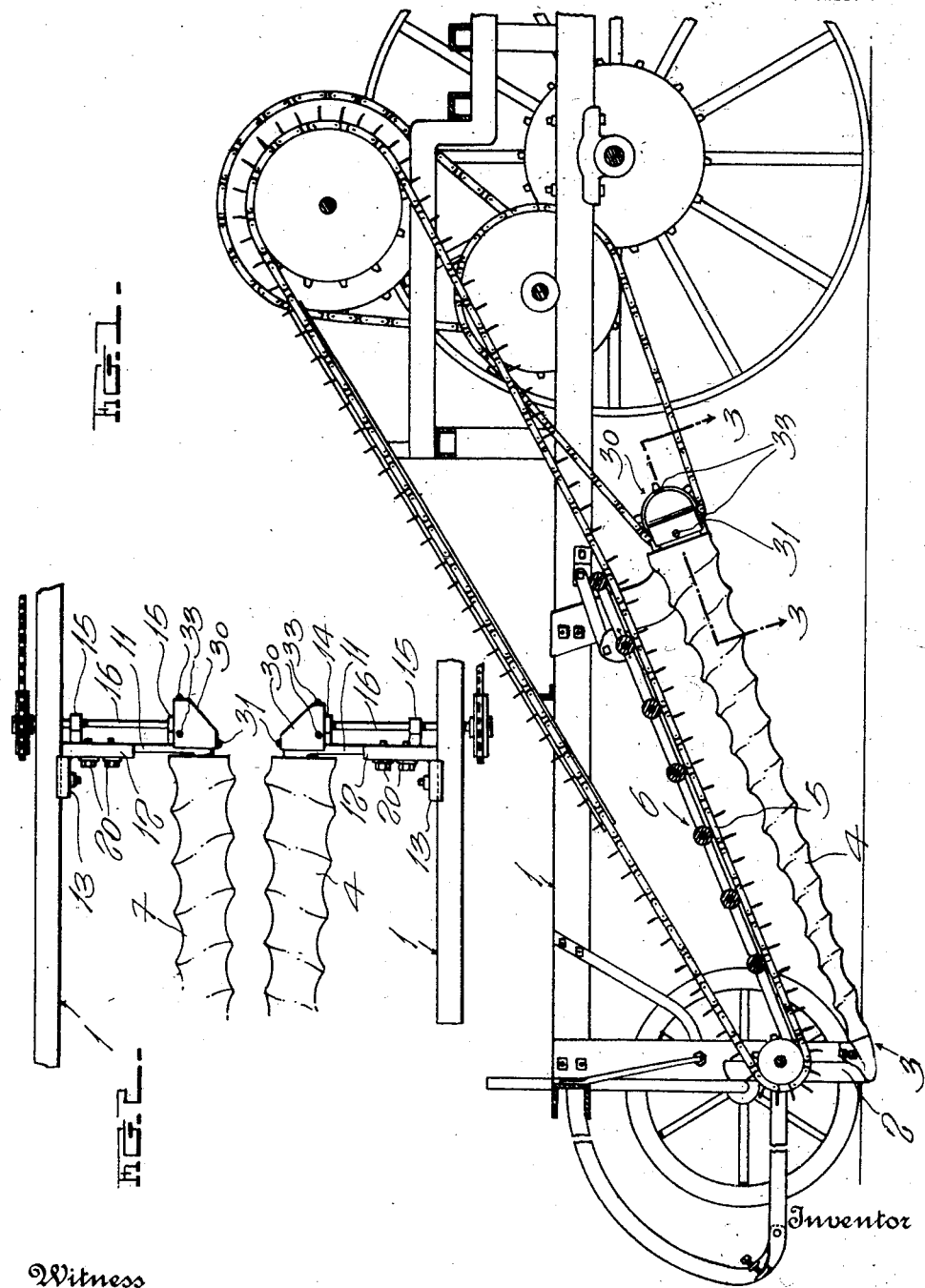

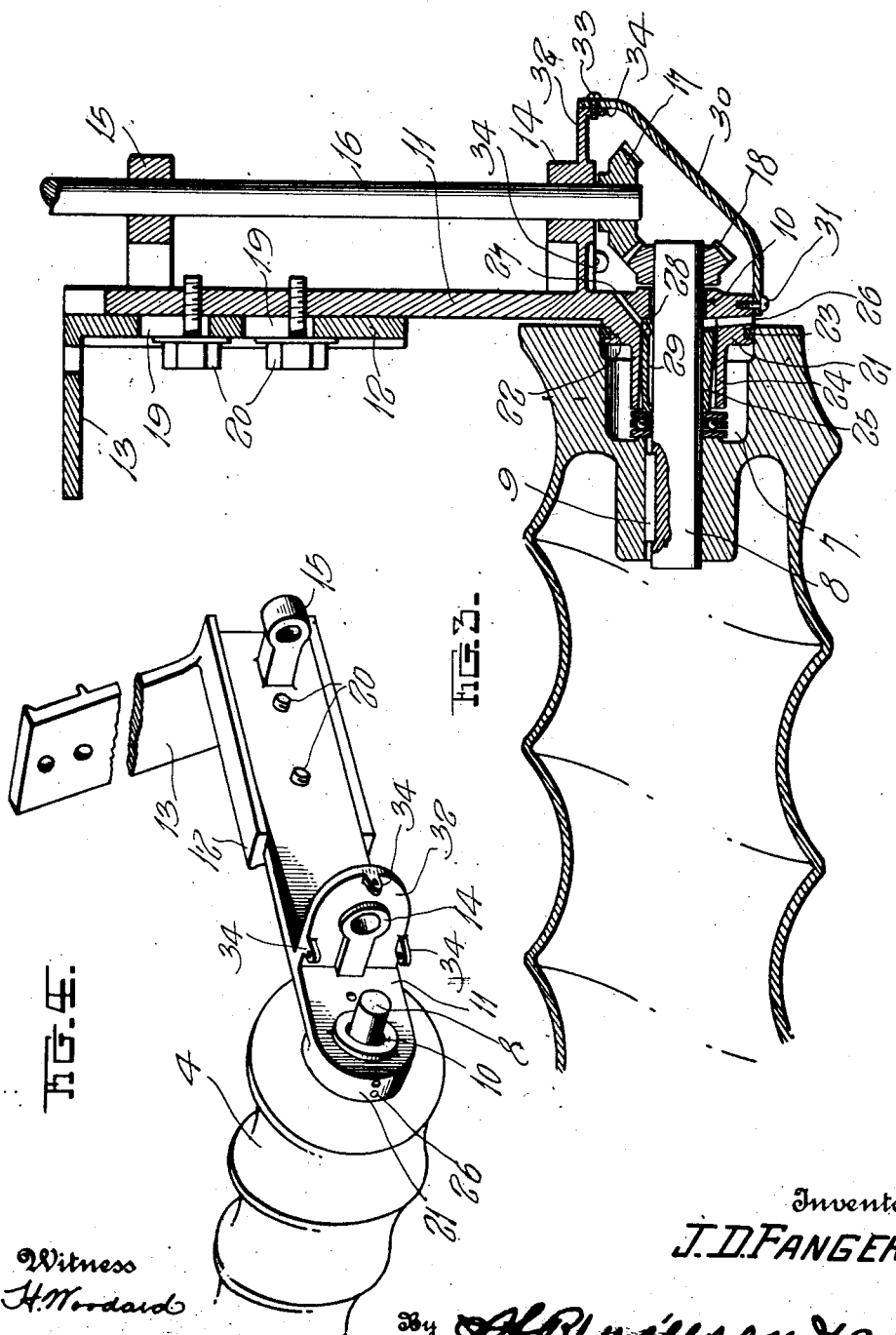

UNITED STATES PATENT OFFICE.

JOSEPH D. FANGER, OF TOLEDO, OHIO, ASSIGNOR TO THE FANGER BEET HARVESTER CO., OF TOLEDO, OHIO, A CORPORATION OF OHIO.

REAR AUGER ADJUSTMENT FOR BEET-HARVESTERS.

1,273,757.　　　　　Specification of Letters Patent.　　Patented July 23, 1918.

Application filed April 5, 1917, Serial No. 159,915. Renewed January 4, 1918. Serial No. 210,406.

*To all whom it may concern:*

Be it known that I, JOSEPH D. FANGER, a citizen of the United States, residing at Toledo, in the county of Lucas and State of Ohio, have invented certain new and useful Improvements in Rear Auger Adjustments for Beet-Harvesters; and I do declare the following to be a full, clear, and exact description of the invention, such as will enable others skilled in the art to which it appertains to make and use the same.

My invention relates to that class of beet harvesting machines including a pair of longitudinally extending augers for removing the beets from the earth and conveying them rearwardly. See, for instance, U. S. Patent No. 1,210,057, issued December 26, 1916.

The object of the present invention is to provide a novel means of adjustably supporting the rear ends of augers and the driving means thereof in such a manner as to permit the space between the two augers to be varied according to the size of the beets being harvested, and with this general object in view, the invention resides in certain novel features of construction and unique combinations of parts to be hereinafter fully described and claimed, the descriptive matter being supplemented by the accompanying drawings which form a part of this specification, and in which:

Figure 1 is a longitudinal section of a beet harvester equipped with the improved adjusting end supporting means for the rear ends of the two augers;

Fig. 2 is a plan view with parts removed;

Fig. 3 is a horizontal section on the plane of the line 3—3 of Fig. 1;

Fig. 4 is a detail perspective view showing one of the slide plates carrying the several bearings and associated parts.

In the drawings above briefly described, the numeral 1 has reference to a portable wheel-supported frame upon which beet digging and topping means are mounted, but since the topping mechanism constitutes no part of the present invention, it is eliminated from the present application and only such old features as coöperate with the invention are shown. Earth slitting blades 2 depend from the front end of the frame and at their lower ends are provided with ball joints 3 which form the subject matter of a separate application, said joints rotatably supporting the front ends of a pair of longitudinally extending augers 4 which are adapted to coöperate with a pronged chain 5 in removing the beets from the earth and conveying them rearwardly to the topping mechanism above referred to. The chain 5 is held in proper engagement with the upper ends of the beets by a weighted chain 6 practically identical with the chain 5 shown in Patent No. 1,210,057, hereinbefore mentioned. The rear ends of the augers 4 are formed with sockets 7 through the centers of which short longitudinal shafts 8 extend, said shafts being keyed at 9 to the augers in such a manner as to permit the latter to be moved forwardly therefrom when the ball joints 3 are removed. The rear ends of the shafts 8 pass rather loosely through openings 10 in the inner ends of horizontally disposed transversely extending slide plates 11 which are received in channel-shaped guides 12 carried by and preferably formed integrally with the lower ends of arms 13 which are secured to the side bars of the frame 1. Inner and outer bearings 14 and 15 are formed integrally with the inner and outer ends of the slide plates 11 and rotatably support a pair of transverse driving shafts 16 whose inner ends are provided with beveled gears 17 meshing with similar gears 18 on the rear ends of the shafts 8. It will thus be observed that sliding of the plates 11 inwardly or outwardly will vary the distance between the rear ends of the two augers and yet that all of the driving means of said augers will remain in proper relation.

Any preferred means may be employed for securing the plates 11 in adjusted position, but the guides 12 are preferably formed with longitudinal slots 19 through which clamping screws 20 pass, said screws being threaded into the aforesaid plates. Loosening of the screws 20 thus permits free adjustment of the slides 11 whereas tightening of said screws will lock said slides against further movement.

The inner end of each plate 11 is formed with an integral circular plug or boss 21, these bosses being received loosely in the rear ends of the sockets 7 and having circumferential grooves 22 in which packing rings 23 are disposed to prevent leakage of lubricating oil or grease from said sockets. Sleeves 24 are formed integrally at one end with the inner ends of the bosses 21 and project into the sockets 7, said sleeves receiving therein bushings 25 which, at their rear ends, are in contact with the inner sides of said sleeves, while the front ends of said bushings are spaced from the sleeves to permit the shafts 8 which pass therethrough to angle as the augers are adjusted laterally at their rear ends. Rotation of the bushings may be prevented in any preferred manner, but pins 26 are preferably employed for this purpose.

Lubricating oil is supplied to the interior of the bushings 25 through oil holes 27 formed through the inner ends of the slide plates 11, said holes communicating with others 28 formed in the bushings, said holes 28 discharging into longitudinal grooves 29 formed in said bushings. Any surplus oil will leak into the sockets 7 but is prevented from running therefrom by the packing rings 23, which rings also prevent dust and grease from entering the bearing and impairing the action thereof. On account of these advantages, the particular type of bearing shown is in most cases employed, but it is to be understood that the invention is not restricted to the use of any particular bearing means since any of the well known types of bearings could be employed.

Housings 30 for the gears 17 and 18 are secured in place in a novel manner, one end of said housings extending over the rounded inner ends of the slide plates 11 and being secured thereto by screws 31, while the other ends of these housings extend over substantially annular flanges 32, formed integrally with and substantially surrounding the inner bearings 14, said flanges being similarly joined to the plates 11. Screws 33 are provided for securing the housing to the flanges 32 and although said screws are shown passing through ears 34 formed integrally with the flanges in question, it will be understood that this construction need not be followed if occasion should otherwise require, since this is an unimportant feature.

From the foregoing, taken in connection with the accompanying drawings, it will be obvious that although the invention is of comparatively simple and inexpensive nature, it will be highly efficient and will readily carry out the object in view. Since the most advantageous results have been derived from the specific construction shown and described, this construction constitutes the preferred form of the auger adjustment, but it is to be understood that within the scope of the invention as claimed, numerous changes may be made.

I claim:

1. In a beet harvesting machine, the combination of a pair of longitudinally extending beet pulling and conveying augers, bearings supporting the rear ends of said augers, slides carrying said bearings and movable transversely of the machine to vary the distance between the augers, transverse shafts for driving said augers, bearings for said shafts carried by and movable bodily with said slides, and means for securing said slides in adjusted position.

2. A structure as specified in claim 1, intermeshing beveled gears on said augers and shafts, housings for said gears, one end of said housings extending over and being secured to the inner ends of said slides, and flanges formed integrally with certain of the shaft bearings and closing the other ends of said housings.

3. In a beet harvesting machine, the combination of a portable frame, a pair of longitudinally extending beet pulling and conveying augers beneath the same, means for supporting the front ends of said augers, a pair of arms depending from the frame and having transverse channel-shaped guides adjacent the rear ends of said augers, transversely extending slide plates mounted adjustably in said guides and means for securing them in adjusted position, bearings carried by the inner ends of said slide plates for supporting the rear ends of the augers, a pair of transversely extending driving shafts for rotating said augers, and additional bearings carried by said slide plates for supporting said shafts.

4. In a beet harvesting machine, the combination of a portable frame, a pair of longitudinally extending beet pulling and conveying augers beneath the same, means for supporting the front ends of said augers, a pair of arms depending from the frame and having transverse channel-shaped guides adjacent the rear ends of said augers, transversely extending slide plates mounted adjustably on said guides and means for securing them in adjusted position, bearings carried by the inner ends of said slide plates and including plugs extending into sockets in the rear ends of the augers, shafts extending from said augers through said sockets and bearings, transverse shafts for driving said first named shafts, and bearings for said transverse shafts carried by said slide plates.

In testimony whereof I have hereunto set my hand in the presence of two subscribing witnesses.

JOSEPH D. FANGER.

Witnesses:
HARRY LEVISON,
MARY SKELLINGTON.